(12) United States Patent
Sun et al.

(10) Patent No.: US 11,288,593 B2
(45) Date of Patent: Mar. 29, 2022

(54) METHOD, APPARATUS AND DEVICE FOR EXTRACTING INFORMATION

(71) Applicant: Baidu Online Network Technology (Beijing) Co., Ltd., Beijing (CN)

(72) Inventors: Mingming Sun, Beijing (CN); Ping Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 1153 days.

(21) Appl. No.: 15/829,677

(22) Filed: Dec. 1, 2017

(65) Prior Publication Data

US 2019/0122145 A1 Apr. 25, 2019

(30) Foreign Application Priority Data

Oct. 23, 2017 (CN) .......................... 201710996056.0

(51) Int. Cl.
*G06F 40/30* (2020.01)
*G06N 20/00* (2019.01)
(Continued)

(52) U.S. Cl.
CPC .......... *G06N 20/00* (2019.01); *G06F 40/169* (2020.01); *G06F 40/253* (2020.01); *G06F 40/295* (2020.01); *G06F 40/30* (2020.01)

(58) Field of Classification Search
None
See application file for complete search history.

(56) References Cited

U.S. PATENT DOCUMENTS 8,332,348 B1 * 12/2012 Avery .................... G06N 5/003
706/61
9,792,560 B2 * 10/2017 Jeong .................... G06F 40/205
(Continued)

FOREIGN PATENT DOCUMENTS

| CN | 104021115 | 9/2014 |
|---|---|---|
| CN | 104615589 | 5/2015 |

(Continued)

OTHER PUBLICATIONS

Appendix to the Specification filed May 14, 2018 in U.S. Appl. No. 15/979,310 (corresponding to Leidner US PG-Pub 2018/0329883 A1), p. 1-14. (Year: 2018).*

(Continued)

*Primary Examiner* — Frank D Mills
(74) *Attorney, Agent, or Firm* — Knobbe, Martens, Olson & Bear LLP

(57) ABSTRACT

A method, apparatus and device are for extracting information. The method includes: acquiring an annotated corpus, which includes a plurality of sample sentences and annotated information sets corresponding to the sample sentences, constructing an input sequence and an output sequence based on the sample sentences and the annotated information sets corresponding to the sample sentences, obtaining an information extraction model generating the output sequence from the input sequence by carrying out training with a deep learning method, and inputting a to-be-processed sentence into the information extraction model to extract a knowledge information set included in the to-be-processed sentence. The annotated information set includes information of at least one piece of the following types of knowledge to be extracted from corresponding sample sentences: knowledge based on verbs or prepositions, knowledge based on noun attributes, knowledge of (Continued)

entity description, and knowledge of a relationship between an entity and a concept.

11 Claims, 6 Drawing Sheets

(51) Int. Cl.
*G06F 40/169* (2020.01)
*G06F 40/253* (2020.01)
*G06F 40/295* (2020.01)

(56) References Cited

U.S. PATENT DOCUMENTS

| | | | | |
|---|---|---|---|---|
| 10,109,275 | B2* | 10/2018 | Henry | G06F 40/289 |
| 10,713,289 | B1* | 7/2020 | Mishra | G06F 40/30 |
| 2007/0179776 | A1* | 8/2007 | Segond | G06F 16/332 |
| | | | | 704/9 |
| 2010/0063797 | A1* | 3/2010 | Cong | G06F 16/367 |
| | | | | 704/9 |
| 2013/0013706 | A1* | 1/2013 | Gupta | G06Q 10/10 |
| | | | | 709/206 |
| 2013/0246435 | A1* | 9/2013 | Yan | G06F 16/355 |
| | | | | 707/741 |
| 2014/0136188 | A1* | 5/2014 | Wroczynski | G06F 40/284 |
| | | | | 704/9 |
| 2015/0066496 | A1* | 3/2015 | Deoras | G06N 3/0454 |
| | | | | 704/232 |
| 2016/0140236 | A1* | 5/2016 | Estes | G06N 5/022 |
| | | | | 707/709 |
| 2017/0270100 | A1* | 9/2017 | Audhkhasi | G06F 40/289 |
| 2017/0278510 | A1* | 9/2017 | Zhao | G10L 15/04 |
| 2017/0323636 | A1* | 11/2017 | Xiao | G06F 40/289 |
| 2018/0103052 | A1* | 4/2018 | Choudhury | H04L 63/1416 |
| 2018/0150743 | A1* | 5/2018 | Ma | G06N 3/084 |
| 2018/0329883 | A1* | 11/2018 | Leidner | G06F 16/2237 |
| 2018/0336183 | A1* | 11/2018 | Lee | G06F 40/30 |

FOREIGN PATENT DOCUMENTS

| | | |
|---|---|---|
| CN | 104794169 | 7/2015 |
| CN | 105447053 | 3/2016 |
| CN | 105903014 | 9/2016 |
| CN | 106991085 | 7/2017 |
| CN | 107133211 | 9/2017 |
| WO | WO2016/150472 | 9/2016 |

OTHER PUBLICATIONS

Liu, Bing, and Ian Lane. "Attention-based recurrent neural network models for joint intent detection and slot filling." arXiv preprint arXiv:1609.01454 (2016). (Year: 2016).*

Kurata, Gakuto, Bing Xiang, Bowen Zhou, and Mo Yu. "Leveraging sentence-level information with encoder lstm for semantic slot filling." arXiv preprint arXiv:1601.01530 (2016). (Year: 2016).*

Lai, Siwei, (2016). *Word and Document Embeddings based on Neural Network Approaches.* The University of Chinese Academy of Sciences, Institute of Automation.

Encoder-Decoder Attention (Oct. 15, 2016).

* cited by examiner

METHOD, APPARATUS AND DEVICE FOR EXTRACTING INFORMATION

CROSS-REFERENCE TO RELATED APPLICATION

This application is related to and claims the priority from Chinese Application No. 201710996056.0, filed on Oct. 23, 2017, entitled "Method, Apparatus and Device for Extracting Information," having Baidu Online Network Technology (Beijing) Co., Ltd. as the applicant, the entire disclosure of which is incorporated herein by reference.

TECHNICAL FIELD

Embodiments of the present application relate to the technical field of computers, and specifically to the field of natural language data processing, in particular to a method, apparatus and device for extracting information.

BACKGROUND

Natural language processing is a technology of processing one's everyday languages to achieve effective communication with computers. It represents an important research direction in the field of artificial intelligence.

In the natural language processing, it may be advantageous to use a knowledge base to understand a text language. The knowledge base can provide abundant entity knowledge information, including attribute information of entities, relation information among the entities, etc. Therefore, how to extract effective knowledge information from a natural language to construct a knowledge base has become a hot topic of academic and industrial researches.

Due to the flexibility and unpredictability of the natural language, it is difficult to extract information automatically. Especially for open information extraction without restricted domains and category entities, knowledge of open category entities, entity relationships etc. should be extracted from a large number of redundant nonstandard texts containing noise. At present, most of schemes adopted by academic and industrial circles are rule-based methods. One of the rule-based methods is to carry out syntactic analysis of a sentence to generate a syntactic analysis tree, and apply rules to the syntactic analysis tree to extract relevant information. For example, corresponding information is extracted according to a position rule of a subject, a predicate and an object in a sentence grammar. Another rule-based method is using a manually calibrated rule to automatically generate some samples, and using the generated samples to train an extractor, so as to realize the information extraction. These rules are usually set by experts, and the rules are usually different in forms for the extraction of different types of information. Therefore, a large number of rules need to be set in an open information extraction scenario when extracting multiple types of information.

SUMMARY

Embodiments of the present application provide a method, apparatus and device for extracting information.

In a first aspect, the embodiments of the present application provide a method for extracting information, including: acquiring an annotated corpus including a plurality of sample sentences and annotated information sets corresponding to the sample sentences; constructing an input sequence and a corresponding output sequence based on the sample sentences and the annotated information sets corresponding to the sample sentences in the annotated corpus respectively; obtaining an information extraction model generating the output sequence from the input sequence by carrying out training with a deep learning method; and inputting a to-be-processed sentence into the generated information extraction model to extract a knowledge information set included in the to-be-processed sentence, wherein the annotated information set includes information, standardized according to a preset rule, of at least one piece of the following knowledge to be extracted from corresponding sample sentences: knowledge based on verbs or prepositions, knowledge based on noun attributes, knowledge of entity description, and knowledge of a relationship between an entity and a concept.

In some embodiments, the training with the deep learning method to obtain the information extraction model generating the output sequence from the input sequence includes: carrying out vectorization processing on objects in the input sequence and annotated information in the output sequence; constructing a neural network of the information extraction model, the neural network of the information extraction model comprising an encoder and a decoder; mapping the input sequence after the vectorization processing into an input hidden state sequence with the encoder, and mapping the output sequence into an output hidden state sequence with the decoder; decoding the input hidden state sequence with the decoder to obtain a predictive state sequence; and adjusting parameters of the neural network according to a difference between the predictive state sequence and the output hidden state sequence.

In some embodiments, the decoding the input hidden state sequence with the decoder to obtain the predictive state sequence includes: for a target position in the predictive state sequence to be generated, obtaining a state, after a predictive state of a previous position of the target position is obtained by decoding, of a hidden layer of the decoder as a current hidden state of the decoder; computing a matching degree between each input hidden state in the input hidden state sequence and a predictive state of the target position in the predictive state sequence to be generated based on the current hidden state; computing an attention weight of the input hidden state to the predictive state of the target position based on the matching degree; carrying out weighted summation on the input hidden state according to the attention weight to obtain a context vector; computing a distribution of a probability of the predictive state of the target position based on the context vector, the output hidden state of the previous position of the target position in the output hidden state sequence, and a state of the hidden layer of the decoder when decoding the predictive state of the target position; and determining the predictive state of the target position according to the probability distribution.

In some embodiments, the computing the matching degree between the each input hidden state in the input hidden state sequence and the predictive state of the target position in the predictive state sequence to be generated based on the current hidden state includes: carrying out a first nonlinear transformation on the current hidden state and the input hidden state to obtain the matching degree between the input hidden state and the predictive state of the target position.

In some embodiments, the computing the matching degree between the each input hidden state in the input hidden state sequence and the predictive state of the target position in the predictive state sequence to be generated based on the current hidden state includes: computing a coverage vector corresponding to the target position based on the current hidden state, wherein the coverage vector is used for recording extracted information in the sample sentence; and carrying out a second nonlinear transformation on the current hidden state, the input hidden state and the coverage vector corresponding to the previous position of the target position to obtain the matching degree between the input hidden state and the predictive state of the target position.

In some embodiments, before computing the matching degree between the each input hidden state in the input hidden state sequence and the predictive state of the target position in the predictive state sequence to be generated based on the current hidden state, the decoding the input hidden state sequence with the decoder to obtain the predictive state sequence further includes: extracting a semantic dependence relationship tree in the sample sentence using a natural language processing method; adding a counter edge for each edge in the semantic dependence relationship tree to construct a path finding map; finding a semantic path between any two objects in the input sequence in the path finding map, and encoding the semantic path into a semantic vector; transforming the semantic vector to obtain a semantic dependence relationship attention vector; and the computing the matching degree between the each input hidden state in the input hidden state sequence and the predictive state of the target position in the predictive state sequence to be generated based on the current hidden state, including: carrying out a third nonlinear transformation based on the current hidden state, the input hidden state and the semantic dependence relationship attention vector to obtain the matching degree between the input hidden state and the predictive state of the target position.

In some embodiments, the probability of the predictive state of the target position is a sum of a probability of copying a word from a corresponding sample sentence as an object in the output sequence and a probability of selecting a target symbol from a preset symbol set and using an object characterized by the target symbol as an object in the output sequence; and the symbols in the preset symbol set are used for combining with the words in the sample sentence, so as to completely characterize one of the following knowledge in the sample sentence: knowledge based on verbs or prepositions, knowledge based on noun attributes, knowledge of entity description, and knowledge of a relationship between an entity and a concept.

In some embodiments, the symbols in the preset symbol set include: a symbol for characterizing a separated predicate in a sentence; a symbol for characterizing reduced information in knowledge expressed by a reduced expression in the sentence; a symbol for characterizing implicit knowledge in the sentence; and a symbol for characterizing lost information in the sentence.

In a second aspect, the embodiments of the present application provide an apparatus for extracting information, including: an acquisition unit, for acquiring an annotated corpus including a plurality of sample sentences and annotated information sets corresponding to the sample sentences; a construction unit, for constructing an input sequence and a corresponding output sequence based on the sample sentences and the annotated information sets corresponding to the sample sentences in the annotated corpus respectively; a training unit, for obtaining an information extraction model generating the output sequence from the input sequence by carrying out training with a deep learning method; and an extraction unit, for inputting a to-be-processed sentence into the generated information extraction model to extract a knowledge information set included in the to-be-processed sentence, wherein the annotated information set includes information, standardized according to a preset rule, of at least one piece of the following knowledge to be extracted from corresponding sample sentences: knowledge based on verbs or prepositions, knowledge based on noun attributes, knowledge of entity description, and knowledge of a relationship between an entity and a concept.

In some embodiments, the training unit is further used for obtaining an information extraction model generating the output sequence from the input sequence by carrying out training with a deep learning method in the following manner: carrying out vectorization processing on objects in the input sequence and annotated information in the output sequence; constructing a neural network of the information extraction model, the neural network of the information extraction model comprising an encoder and a decoder; mapping the input sequence after the vectorization processing into an input hidden state sequence with the encoder, and mapping the output sequence into an output hidden state sequence with the decoder; decoding the input hidden state sequence with the decoder to obtain a predictive state sequence; and adjusting parameters of the neural network according to a difference between the predictive state sequence and the output hidden state sequence.

In some embodiments, the training unit is further used for obtaining the predictive state sequence in the following manner: for a target position in the predictive state sequence to be generated, obtaining a state, after a predictive state of a previous position of the target position is obtained by decoding, of a hidden layer of the decoder as a current hidden state of the decoder; computing a matching degree between each input hidden state in the input hidden state sequence and a predictive state of the target position in the predictive state sequence to be generated based on the current hidden state; computing an attention weight of the input hidden state to the predictive state of the target position based on the matching degree; carrying out weighted summation on the input hidden state according to the attention weight to obtain a context vector; computing a distribution of a probability of the predictive state of the target position based on the context vector, the output hidden state of the previous position of the target position in the output hidden state sequence, and a state of the hidden layer of the decoder when decoding the predictive state of the target position; and determining the predictive state of the target position according to the probability distribution.

In some embodiments, the training unit is further used for computing the matching degree between the each input hidden state in the input hidden state sequence and the predictive state of the target position in the predictive state sequence to be generated in the following manner: carrying out a first nonlinear transformation on the current hidden state and the input hidden state to obtain the matching degree between the input hidden state and the predictive state of the target position.

In some embodiments, the training unit is further used for computing the matching degree between the each input hidden state in the input hidden state sequence and the predictive state of the target position in the predictive state sequence to be generated in the following manner: computing a coverage vector corresponding to the target position based on the current hidden state, wherein the coverage vector is used for recording extracted information in the sample sentence; and carrying out a second nonlinear transformation on the current hidden state, the input hidden state and the coverage vector corresponding to the previous position of the target position to obtain the matching degree between the input hidden state and the predictive state of the target position.

In some embodiments, before computing the matching degree between the each input hidden state in the input hidden state sequence and the predictive state of the target position in the predictive state sequence to be generated based on the current hidden state, the training unit is further used for executing the following operations: extracting a semantic dependence relationship tree in the sample sentence using a natural language processing device; adding a counter edge for each edge in the semantic dependence relationship tree to construct a path finding map; finding a semantic path between any two objects in the input sequence in the path finding map, and encoding the semantic path into a semantic vector; transforming the semantic vector to obtain a semantic dependence relationship attention vector; and the training unit is used for computing the matching degree between the each input hidden state in the input hidden state sequence and the predictive state of the target position in the predictive state sequence to be generated in the following manner: carrying out a third nonlinear transformation based on the current hidden state, the input hidden state and the semantic dependence relationship attention vector to obtain the matching degree between the input hidden state and the predictive state of the target position.

In some embodiments, the probability of the predictive state of the target position is a sum of a probability of copying a word from a corresponding sample sentence as an object in the output sequence and a probability of selecting a target symbol from a preset symbol set and using an object characterized by the target symbol as an object in the output sequence; and the symbols in the preset symbol set are used for combining with the words in the sample sentence, so as to completely characterize one of the following knowledge in the sample sentence: knowledge based on verbs or prepositions, knowledge based on noun attributes, knowledge of entity description, and knowledge of a relationship between an entity and a concept.

In some embodiments, the symbols in the preset symbol set include: a symbol for characterizing a separated predicate in a sentence; a symbol for characterizing reduced information in knowledge expressed by a reduced expression in the sentence; a symbol for characterizing implicit knowledge in the sentence; and a symbol for characterizing lost information in the sentence.

In a third aspect, the embodiments of the present application provide equipment, including: one or more processors; and a storage device for storing one or more programs, wherein when the one or more programs are executed by the one or more processors, the one or more processors implement the method for extracting information.

According to the method, apparatus and device for extracting information, provided by the embodiments of the present application, extraction of a variety of different types of knowledge information is realized by using one information extraction model, the information extraction efficiency is promoted, the model obtained by training based on the deep learning method can adapt to diversity and flexibility of expression of a natural language, the deviation caused by limitation of rules is avoided, and the accuracy and recall rate of information extraction can be improved by virtue of the following operations: acquiring an annotated corpus including a plurality of sample sentences and annotated information sets corresponding to the sample sentences; then constructing an input sequence and a corresponding output sequence based on the sample sentences and the annotated information sets corresponding to the sample sentences in the annotated corpus respectively; then carrying out training with a deep learning method to obtain an information extraction model generating the output sequence from the input sequence; and finally, inputting a to-be-processed sentence into the generated information extraction model to extract a knowledge information set included in the to-be-processed sentence, wherein the annotated information set includes information, standardized according to a preset rule, of at least one piece of the following knowledge to be extracted from corresponding sample sentences: knowledge based on verbs or prepositions, knowledge based on noun attributes, knowledge of entity description, and knowledge of a relationship between an entity and a concept.

BRIEF DESCRIPTION OF THE DRAWINGS

Other features, objectives and advantages of the present application will become more apparent by reading a detailed description of the non-limiting embodiments with reference to the following drawings.

DETAILED DESCRIPTION OF EMBODIMENTS

The present application will be further described below in detail in combination with the accompanying drawings and the embodiments. It should be appreciated that the specific embodiments described herein are merely used for explaining some innovative aspects rather than limiting the invention. In addition, it should be noted that, for the ease of description, only the parts related to some innovative aspects are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
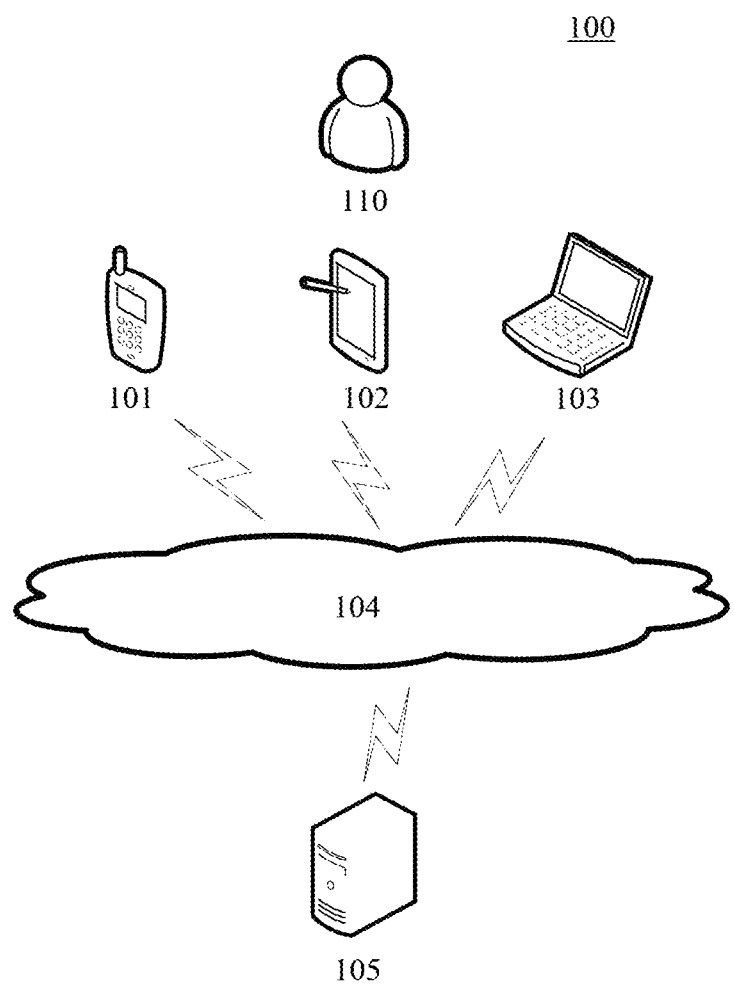
FIG. 1 is an illustrative system architecture diagram to which the present application can be applied.

FIG. 1 shows an exemplary architecture of a system 100 which may be used by a method and apparatus for extracting information according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as web browser applications, shopping applications, search applications, instant messaging tools, mailbox clients, social platform software, may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server for providing various services, for example, a search engine server providing a support for a search result displayed on the terminal devices 101, 102 and 103. The search engine server can perform semantic analysis on a received search sentence, analyze demand information included in the search sentence, query related data according to the demand information, and feed a query result (e.g., a web page link or page content) back to the terminal devices.

It should be noted that the method for extracting information, provided by the embodiments of the present application, can be implemented by the terminal devices 101, 102 and 103 or the server 105, and correspondingly, the device for extracting information can be arranged in the terminal devices 101, 102 and 103 or the server 105.

It should be appreciated that the numbers of the terminal devices, networks, and servers in FIG. 1 are only schematic. According to an implementation requirement, any number of the terminal devices, networks and servers may be provided.

Figure 2:
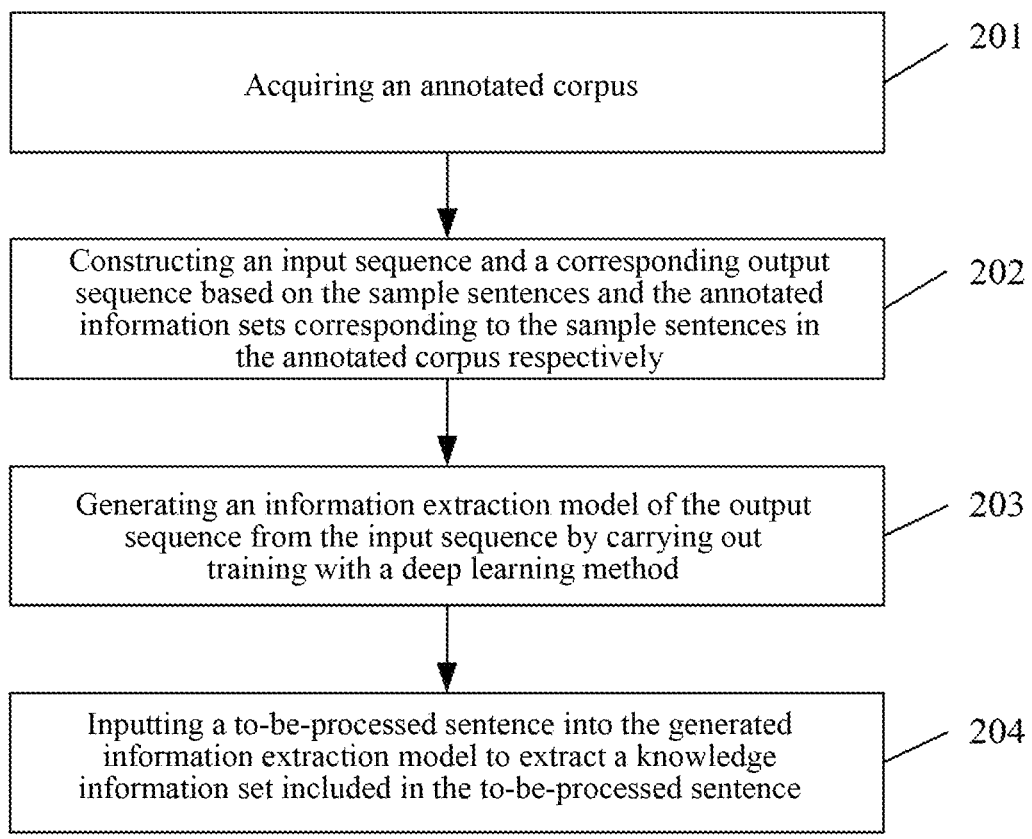
FIG. 2 is a flow diagram of an embodiment of the method for extracting information according to the present application.

Further referring to FIG. 2, it shows a process 200 of an embodiment of the method for extracting information according to the present application. The method for extracting information includes the following steps:

Step 201, acquiring an annotated corpus.

Here, the annotated corpus may include a plurality of sample sentences and annotated information sets corresponding to the sample sentences. The sample sentences may be sentences in an open domain without restricted domains and entity categories, and the sample sentences in the corpus may include sentences in different mains and having different structured organization forms.

In the present embodiment, the electronic device (e.g., the terminal devices or the server shown in FIG. 1) on which the method for extracting information is operated may obtain the stored corpus. Specifically, the annotated corpus may be pre-constructed and stored locally, so that the electronic device can obtain the corpus from a local memory; or the annotated corpus may be stored in other electronic devices (e.g., a server), so that the electronic device can obtain the corpus through communication connection with an electronic device for storing the annotated corpus.

The annotated corpus may include manually annotated corpus data which may be sentences in a text form and annotation results of knowledge information included in these sentences. In the present embodiment, the annotated corpus may be used as a sample data set to train the information extraction model, the sentences in the corpus are sample sentences, and the annotation result of the knowledge information included in the sample sentences is an annotated information set of the sample sentences.

The annotated information set may include information standardized according to a preset rule of one of the following knowledge to be extracted from corresponding sample sentences: knowledge based on verbs or prepositions, knowledge based on noun attributes, knowledge of entity description, and knowledge of a relationship between an entity and a concept. In other words, the information in the annotated information set may be formed in the following manner: extracting knowledge of the following types from the sample sentences: knowledge based on verbs or prepositions, knowledge based on noun attributes, knowledge of entity description, and knowledge of a relationship between an entity and a concept; and then performing standardization representation on these knowledge according to a preset rule. Here, the preset rule may be a predefined expression of various types of knowledge in the sentences, for example, a template for various types of knowledge.

The knowledge based on verbs or prepositions may be knowledge for characterizing information of actions or states in the sentences; the knowledge based on noun attributes may be knowledge for characterizing attribute information of nouns in the sentences; the knowledge of the entity description may be knowledge for characterizing description information of entities in the sentences; and the knowledge of the relationship between an entity and a concept may be knowledge for characterizing relationship information between the entity and the concept.

As an example, a sentence "Li Bai (701-762), deeply affected by thoughts of Zhuangzi, was cheerful and generous, loved drinking wine and composing poetry, liked to make friends, and had representative works including 'Watching The Lu Mountain Falls' and other famous poems" contains verbs "love" and "like" and a preposition "affected by", an entity "Li Bai", a noun "Li Bai", noun attributes "(701-762)" and "representative works including 'Watching The Lu Mountain Falls'", description information "cheerful and generous", and relationship information "'Watching The Lu Mountain Falls' is a famous poem".

In this example, the sentence contains the following types of knowledge: the knowledge based on verbs or prepositions: Li Bai was deeply affected by thoughts of Zhuangzi, loved drinking wine and composing poetry, and liked to make friends; the knowledge based on noun attributes: Li Bai's birth date is the year 701, Li Bai's death date is the year 762, and Li Bai's representative is "Watching The Lu Mountain Falls"; the knowledge of entity description: Li Bai was cheerful and generous; and the knowledge of a relationship between an entity and a concept: the "Watching The Lu Mountain Falls" is a famous poem.

The knowledge above contains some knowledge that cannot be extracted directly from the sentence through semantic analysis and other methods; moreover, the expressions of the same type of knowledge extracted from different sentences may be different. In order to express these types of knowledge that cannot be directly extracted, and unify the expressions of the same type of knowledge, so as to learn the logic of information extraction more easily in the follow-up model training based on deep learning, these types of knowledge can be standardized according to a preset rule during annotation. Here, the preset rule may include conventional expressions of all types of knowledge, and also include the conventional expressions of the knowledge that cannot be extracted from the sentence directly.

Optionally, symbol-assisted knowledge expressions can be used to standardize the above knowledge. The symbols introduced here can be defined in the preset rule, and these predefined symbols can be used to assist words in the sentence to completely express all types of knowledge. For example, symbols of "BIRTH" and "DEATH" are introduced to assist the expressions of birthday and dead day "(701-762)".

The preset rule above can be used as a rule to annotate the knowledge in the sample sentence by an annotator. The knowledge in a sentence S can be expressed by an N tuple: (Subject, Predicate, Arg1, Arg2, . . . ), wherein the Subject stands for a subject which usually is an entity or a noun, Predicate stands for a predicate which usually is a verb or a preposition, and Arg1 and Arg2, . . . stand for objects which usually may be entities or nouns.

In some specific application scenarios, the preset rule specifically may include: the knowledge is expressed by original words in the sentence as far as possible; and the following symbols can be introduced to express the knowledge that cannot be completely expressed by the original words in the sentence:

1) a symbol for characterizing a separated predicate in the sentence: the separated predicate here may be a predicate word or a preposition word separated by other words in the sentence, for example, in the above example, "Li Bai was deeply affected by thoughts of Zhuangzi" may be expressed as (Li Bai, deeply X affected by, Zhuangzi);

2) a symbol for characterizing reduced information in the knowledge expressed by a reduced expression in the sentence: the reduced expression refers to an incomplete expression, for example, in the above example, "Li Bai (701-762)" may be expressed as (Li Bai, BIRTH, Year 701) and (Li Bai, DEATH, Year 762), and for another example, "NBA (National Basketball Association)" may be expressed as (NBA, =, National Basketball Association);

3) a symbol for characterizing implicit knowledge in the sentence, to assist the expression of the implicit knowledge in the sentence, for example, "London, England" may be expressed as (London, IN, England); and 4) a symbol for characterizing lost information in the sentence, to make the knowledge complete, for example, in the above example, "liked to make friends" may be expressed as (Li Bai, liked, make friends), and "cheerful and generous" may be expressed as (Li Bai, DESC, cheerful and generous).

In addition, during annotation, the knowledge in the sentence is independent, and all the knowledge has been marked out. Moreover, a plurality of nouns or entities connected to an identical predicate in a source sentence can be expressed as one knowledge, for example, "Li Bai loved drinking wine and composing poetry" may be standardized as (Li Bai, loved, [drinking wine][composing poetry]).

After the knowledge extracted from the sample sentence is standardized, the information for characterizing the knowledge is obtained, and the information for characterizing the knowledge in the identical sample sentence is gathered together to generate an annotated information set corresponding to the sample sentence.

By virtue of standardization of the knowledge in the sample sentence according to the preset rule, richer knowledge can be expressed, and the accuracy of the knowledge is guaranteed. Therefore, by using the information extraction model obtained by training with the annotated information set corresponding to the sample sentence, all kinds of knowledge in natural language sentences can be extracted accurately, then a knowledge base of an open domain is completed, and more complete knowledge information is provided for text summarization, text understanding, lexical similarity and other tasks.

Step 202, constructing an input sequence and a corresponding output sequence based on the sample sentences and the annotated information sets corresponding to the sample sentences in the annotated corpus respectively.

The sample sentences in the annotated corpus can be serialized to obtain the input sequence, and the annotated information sets corresponding to the sample sentences can be serialized to obtain the corresponding output sequence.

Specifically, word segmentation can be carried out on the sample sentences, and the input sequence is constructed according to results of word segmentation. For example, the result of word segmentation of the sample sentence "Li Bai was deeply affected by thoughts of Zhuangzi, loved drinking wine and composing poetry, and liked to make friends" may be "Li Bai, deeply, thoughts of Zhuangzi, affected, loved, drinking wine, composing poetry, liked, make friends", and then the input sequence S can be expressed as:

$$S=[w_1^S, w_2^S, \ldots, w_{N_S}^S]; \quad (1)$$

Wherein, $w_i^S$ stands for a word in the sample sentence, and i=1, 2, . . . , NS; and NS is the amount of words obtained after word segmentation of the sample sentence.

The output sequence may be a sequence composed of information in the annotated information sets corresponding to the sample sentences, and can be expressed as:

$$F=[w_1^F, w_2^F, \ldots, w_{N_F}^F]; \quad (2)$$

Wherein, $w_j^F$ stands for a piece of information in the annotated information set, and j=1, 2, . . . , NF; and NF is the amount of information in the annotated information set.

Step 203, obtaining an information extraction model generating the output sequence from the input sequence by carrying out training with a deep learning method.

In the present embodiment, a model based on deep learning can be constructed, and then it is trained based on the input sequence and the output sequence corresponding to the annotated corpus. Specifically, a multilayer neural network can be constructed as a framework of the model, the input sequence is input into the multilayer neural network to predict, and then parameters of the multilayer neural network are corrected according to a prediction result. Here, the multilayer neural network may be an RNN (Recurrent Neutral Network), a CNN (Convolutional Neural Network), etc. During training, the multilayer neural network can learn a logic of generating the corresponding output sequence from the input sequence, namely learn a logic of extracting knowledge included in a sample sentence.

Step 204, inputting a to-be-processed sentence into the generated information extraction model to extract a knowledge information set included in the to-be-processed sentence.

After the information extraction model is generated by using the deep learning method, the to-be-processed sentence can be input into the information extraction model. The information extraction model can extract knowledge information included in the to-be-processed sentence to form a knowledge information set.

In the present embodiment, the to-be-processed sentence may be a natural language text, and the knowledge information extracted from the to-be-processed sentence may have an identical knowledge expression with the annotated information set of the sample sentence. Because the knowledge based on verbs or prepositions, the knowledge based on noun attributes, the knowledge of entity description and the knowledge of a relationship between an entity and a concept are annotated in a training sample of the information extraction model, the information extraction model can extract the four types of knowledge from the to-be-processed sentence simultaneously.

According to the method for extracting information, provided by the embodiments of the present application, the extraction of a variety of different types of information is realized by using one information extraction model, the information extraction efficiency is promoted, the model obtained by training based on the deep learning method can adapt to diversity and flexibility of expression of a natural language, the deviation caused by limitation of rules is avoided, and the accuracy and recall rate of information extraction can be improved by virtue of the following operations: acquiring an annotated corpus including a plurality of sample sentences and annotated information sets corresponding to the sample sentences; then constructing an input sequence and a corresponding output sequence based on the sample sentences and the annotated information sets corresponding to the sample sentences in the annotated corpus respectively; then carrying out training by using a deep learning method to obtain an information extraction model generating the output sequence from the input sequence; and finally, inputting a to-be-processed sentence into the generated information extraction model to extract a knowledge information set included in the to-be-processed sentence, wherein the annotated information set includes information, standardized according to a preset rule, of at least one piece of the following knowledge to be extracted from corresponding sample sentences: knowledge based on verbs or prepositions, knowledge based on noun attributes, knowledge of entity description, and knowledge of a relationship between an entity and a concept.

Moreover, because the sample sentence is annotated according to the preset rule during training to form a standardized knowledge information set, the extraction of information from sentences in different fields and having different language structure forms can be realized, and the influence of noise can be effectively filtered out, thereby enabling the method to achieve a good effect in extraction of open information.

Figure 3:
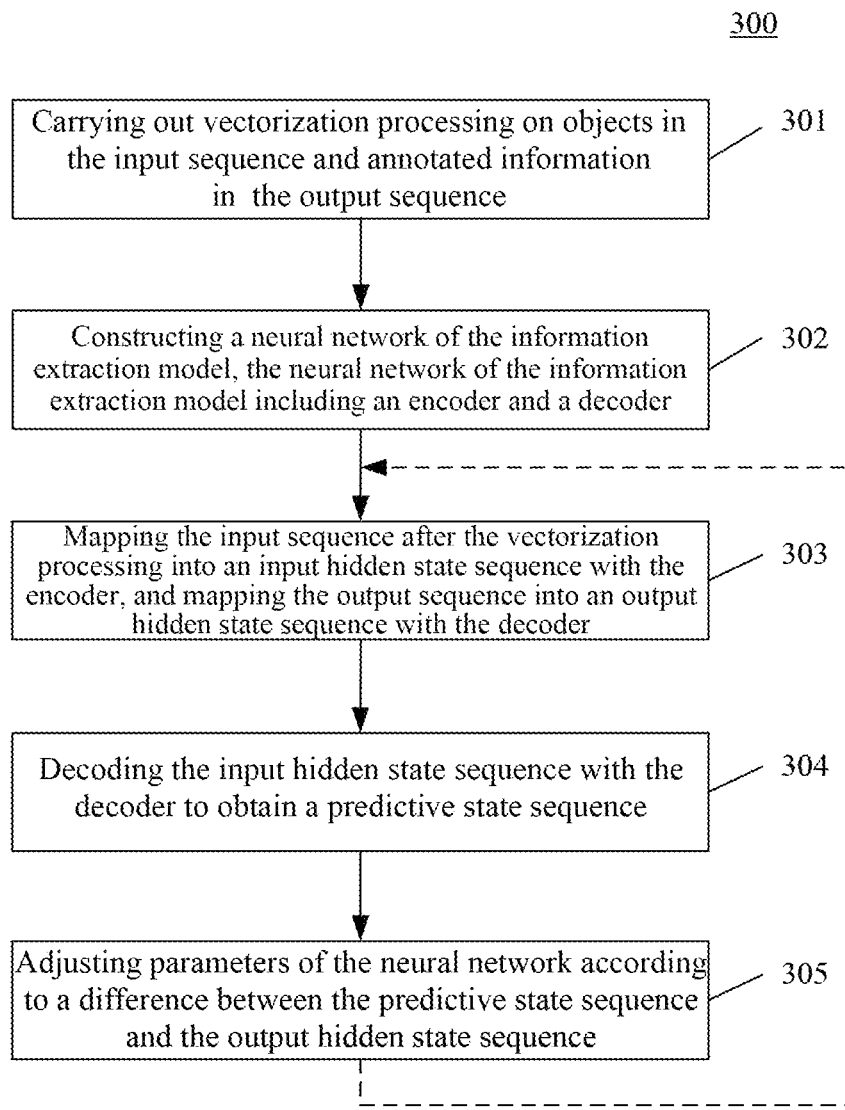
FIG. 3 is a flow diagram of an embodiment of obtaining an information extraction model by carrying out training with a deep learning method in the method for extracting information according to the present application.

In some embodiments, the information extraction model can be constructed and generated by adopting a method of learning from sequence to sequence. Specifically, referring to FIG. 3, it shows a flow diagram of an embodiment of obtaining an information extraction model by carrying out training with a deep learning method in the method for extracting information according to the present application. As shown in FIG. 3, the process 300 of obtaining an information extraction model generating the output sequence from the input sequence by carrying out training with a deep learning method may include the following steps:

Step 301, carrying out vectorization processing on objects in the input sequence and annotated information in the output sequence.

In the present embodiment, a vocabulary may be constructed, and each word in the input sequence S and each word in the output sequence F are expressed as a one-hot vector, namely a binary vector is constructed by supposing that the number of words in the vocabulary is n according to a word serial number or order in the vocabulary, and the length of the vector is n; and the word serial number or the order of each word in the input sequence S and each word in the output sequence F is searched in the vocabulary, an element of a corresponding word serial number or order in the vector is 1, and other elements are 0.

Then, dimensionality reduction may be carried out on a vector representation $v^S=(v_1^S, v_2^S, \ldots, v_n^S)$ of a word $v^S$ in the input sequence S and a vector representation $v^F=(v_1^F, v_2^F, \ldots, v_n^F)$ of a word $v^F$ in the output sequence F, wherein $v_i^S$ and $v_j^F$ stand for the ith element of the word $v^S$ in the input sequence and the jth element of the word $v^F$ in the output sequence respectively. After dimensionality reduction, the word $v^S$ may be expressed as a distributed vector xi, and the word $v^F$ may be expressed as a distributed vector yi. Wherein, $x_i=Ev_i^S$, $y_i=Ev_j^F$, and E is a vocabulary matrix.

Optionally, NER (Named Entity Recognition) marks of the words in the input sequence and the output sequence and information of word classes etc. of the words can be expressed as distributed vectors in the same way, and all vectors of each word are spliced together to generate a representation vector of the word.

Step 302, constructing a neural network of the information extraction model.

The neural network of the information extraction model includes an encoder and a decoder.

In the present embodiment, a multilayer neural network may be constructed as a framework of the information extraction model. The multilayer neural network may be a sequence-to-sequence learning model and includes an encoder and a decoder.

The encoder is used for encoding the input sequence to generate a middle vector, and the decoder is used for decoding the middle vector to obtain a prediction result of the input sequence. Specifically, the encoder can adopt RNN or DNN and includes at least one hidden layer; and when the encoder is used for encoding, the nonlinear transformation can be carried out on current to-be-encoded data in conjunction with the state of the hidden layer of the encoder to obtain a middle vector. The decoder can adopt RNN or DNN and also includes at least one hidden layer; and during decoding, the decoder decodes the middle vector to obtain a prediction result in conjunction with decoded data and the current state of the hidden layer of the decoder.

Step 303, mapping the input sequence after the vectorization processing into an input hidden state sequence with the encoder, and mapping the output sequence into an output hidden state sequence with the decoder.

Before carrying out iteration according to the input sequence and the output sequence to adjust parameters of the neural network, the neural network of the information extraction model can be used to construct a hidden state sequence of the input sequence and the output sequence. Here, the hidden state sequence may be a state sequence of the hidden layer after carrying out transformation on the input sequence after vectorization processing and the output sequence after vectorization processing by using the hidden layer of the neural network. For example, the hidden state $h_i^S$ of xi in the input sequence is $h_i^S=Wx_i+b$, wherein W, and b are parameter matrices of nonlinear variation.

In the present embodiment, the encoder may include a recurrent neutral network, for example, a two-layer bidirectional recurrent neutral network, and the encoder can be used for carrying out the nonlinear transformation to map the input sequence (x1, x2, ..., xNs) after vectorization processing into an input hidden state sequence $H^S=(h_1^S, h_2^S, \ldots, h_{N_S}^S)$. The decoder may include a multilayer recurrent neutral network, for example, a three-layer recurrent neutral network, and the decoder is used to map the output sequence (y1, y2, ..., yNs) after vectorization into an output hidden state sequence $H^F=(h_1^F, h_2^F, \ldots, h_{N_F}^F)$.

Step 304, decoding the input hidden state sequence with the decoder to obtain a predictive state sequence.

Then, the input hidden state sequence $H^S=(h_1^S, h_2^S, \ldots, h_{N_S}^S)$ may be decoded by the decoder. During decoding, a middle semantic vector for assisting decoding may be generated according to each hidden state of the encoder in the generated input hidden state sequence, and the middle semantic vector may be a hidden state when the encoder encodes the last word in the input sequence, or the sum of the hidden states of the encoder.

Nonlinear variation may be carried out on each input hidden state in the input hidden state sequence in sequence based on the middle semantic vector to obtain a prediction result of the current input hidden state. The prediction result may be a predictive state, similar to the output hidden state in the output hidden state sequence, of the hidden layer of the decoder. Then, nonlinear variation is carried out on the predictive state to output a prediction result sequence.

After decoding all the input hidden states, a corresponding predictive state sequence can be obtained.

In some optional implementations in the present embodiment, the step 304 of decoding the input hidden state sequence with the decoder to obtain the predictive state sequence may include:

Firstly, for a target position t in a predictive state sequence to be generated, a state st−1, after a predictive state of a previous position t−1 of the target position t is obtained by decoding, of a hidden layer of the decoder is obtained as the current hidden state of the decoder.

Then, the matching degree etj between each input hidden state $h_j^S$ in the input hidden state sequence and the predictive state $h_t^O$ of the target position t in the predictive state sequence $H^O=(h_1^O, h_2^O, \ldots, h_{N_O}^O)$ to be generated is computed based on the current hidden state st−1, and here, a matching degree computing method may also be called as an alignment model, and the matching degree etj may stand for the alignment degree between the target position t and a position j of the input sequence.

In some optional implementations, the matching degree between the each input hidden state in the input hidden state sequence and the predictive state of the target position in the predictive state sequence to be generated can be computed in the following manner: carrying out a first nonlinear transformation on the current hidden state and the input hidden state to obtain the matching degree between the input hidden state and the predictive state of the target position. Specifically, the matching degree can be computed according to Formula (3):

$$e_{tj}=a(s_{t-1},h_j^S)=v_a^T \tan h(W_a s_{t-1}+U_a h_j^S) \quad (3)$$

wherein, $v_a^T$ is a is a parameter vector, $W_a$ and $U_a$ are parameter matrices of the decoder, and tan h is a transformation function of the first nonlinear transformation.

In some other optional implementations, a coverage mechanism may be introduced to improve the problems of "under extraction" and "excessive extraction", and the matching degree between the each input hidden state in the input hidden state sequence and the predictive state of the target position in the predictive state sequence to be generated can be computed in the following manner: computing a coverage vector corresponding to the target position based on the current hidden state, wherein the coverage vector is used for recording extracted information in the sample sentence; and carrying out a second nonlinear transformation on the current hidden state, the input hidden state and the coverage vector corresponding to the previous position of the target position to obtain the matching degree between the input hidden state and the predictive state of the target position.

In the above implementation in which the coverage mechanism is introduced, a coverage vector $m_j^t$ may be set for each word (a word at the position t), and the coverage vector $m_j^t$ can be updated according to the following method:

$$m_j^t = \mu(m_j^{t-1}, \alpha_{tj}, h_j^S, s_{t-1}) = (1-z_i) \circ m_j^{t-1} + z_j \circ \tilde{m}_j^t \quad (4)$$

wherein, $$\tilde{m}_j^t = \tanh(W_h h_j^S + u_\alpha \alpha_{tj} + W_s s_{t-1} + U_m[r_i \circ m_j^{t-1}]) \quad (5)$$

wherein, "∘" is a matrix operated according to element multiplication, zi is an update gate, and ri is a reset gate, which are computed according to formulas (6) and (7) respectively:

$$z_i = \sigma(W_h^z h_j^S + u_\alpha^z \alpha_{tj} + W_s^z s_{t-1} + U_m^z m_j^{t-1}) \quad (6)$$

$$r_i = \sigma(W_h^r h_j^S + u_\alpha^r \alpha_{tj} + W_s^r s_{t-1} + U_m^r m_j^{t-1}) \quad (7)$$

wherein, $W_h^z$, $W_s^z$, $U_m^z$, $W_h^r$, $W_s^r$, $U_m^r$, $W_h$, $W_s$ and $U_m$ are parameter matrices of a neural network, $u_\alpha$, $u_\alpha^z$ and $u_\alpha^r$ are parameter vectors of the neural network, and σ stands for an activation function and can also be a nonlinear transformation function.

Here, the coverage vector may be recorded in a word in a source sentence (a sample sentence during training) during information extraction and is copied to form a history record of knowledge information, thereby helping the decoder to make a current decision. At this time, the matching degree can be computed according to Formula (8):

$$e_{tj}=a(s_{t-1},h_j^S,m_j^{t-1})=v_a^T \tan h(W_a s_{t-1}+U_a h_j^S+V_a m_j^{t-1}) \quad (8)$$

wherein, $V_a$ is a parameter matrix in the neural network, and tan h is a transformation function of the second nonlinear transformation.

It can be seen from Formula (8) that the matching degree $e_{tj}$ is obtained after second nonlinear transformation carried out with the current hidden state st−1, the input hidden state $h_j^S$ and the coverage vector $m_j^{t-1}$ corresponding to the previous position of the target position, thus, the current to-be-decoded knowledge can be extracted in conjunction with decoded knowledge information, repeated extraction of the knowledge information can be avoided, and at the same time, it can guarantee that the knowledge information will not be omitted.

In some other optional implementations, before computing the matching degree between the each input hidden state in the input hidden state sequence and the predictive state of the target position in the predictive state sequence to be generated based on the current hidden state, the step of decoding the input hidden state sequence with the decoder to obtain the predictive state sequence may further include a step of analyzing a semantic dependence relationship, and the step of analyzing the semantic dependence relationship may include:

Firstly, a semantic dependence relationship tree in the sample sentence is extracted by using a natural language processing method, and specifically, semantic association among language units of the sentence can be analyzed by using a semantic analysis method, and is presented through a dependence tree structure. Wherein, the semantic dependence relationship may include a main semantic role, an event relationship and a semantic dependence mark, and the type of the relationship may include a subject-predicate relationship, verb-object relationship, an indirect object relationship, a prepositional object, a verb-complement structure, a preposition-object relationship etc. Each edge in the semantic relationship tree has a label showing a relationship.

Then, a counter edge may be added for each edge in the semantic dependence relationship tree to construct a path finding map. Specifically, a minus may be added in front of the label of an original edge to form a label of the counter edge.

Then, a semantic path between any two objects is searched in the input sequence in the path finding map, and is encoded into a semantic vector. Specifically, the shortest path between two words ($w_i^S$, $w_j^S$) in the sample sentence may be found in the path finding map to serve as the semantic path, and the semantic path may be encoded into a semantic vector nij by using methods of RNN etc.

Then, the semantic vector is transformed to obtain a semantic dependence relationship attention vector. Specifically, the semantic dependence relationship attention vector $$u_j^i = g\left(\overset{\square}{u_j^i}\right),$$

wherein, g is gate operation of such as a GRU (Gated Recurrent Unit), and can be a gate function defined by the current hidden state and the input hidden state, and $$\overset{\square}{u_j^i}$$

can be:

$$\overset{\square}{u_j^i} = \sum_i p * (w_t^F = w_i^S) n_{ij} \quad (9)$$

wherein, p* is a sharpening result of the distribution of the probability p of the predictive state $h_t^O$ of the target position. Here, p can be subjected to k power operation, and then is normalized to obtain p*, which makes a probability value close to 1 closer to 1, while the smaller probability tends to 0.

At this time, the step of computing the matching degree between the each input hidden state in the input hidden state sequence and the predictive state of the target position in the predictive state sequence to be generated based on the current hidden state may include: carrying out a third nonlinear transformation based on the current hidden state, the input hidden state and the semantic dependence relationship attention vector to obtain the matching degree between the input hidden state and the predictive state of the target position. Specifically, the matching degree can be computed according to Formula (10):

$$e_{tj} = a(s_{t-1}, h_j^S, m_j^{t-1}) = v_a^T \tan h(W_a s_{t-1} + U_a h_j^S + V_a m_j^{t-1} + D_a u_j^{t-1}) \quad (10)$$

wherein, $D_a$ is also a parameter matrix in the neural network and is used for transforming the semantic dependence relationship attention vector, and tan h is a transformation function of the third nonlinear transformation.

By introducing the semantic dependence relationship attention vector, the neural network can automatically determine decoded words and to-be-decoded words that are depended in decoding according to the lexeme of a source sentence, and the semantic dependence relationship of each sample sentence is effectively integrated in the process of training to further improve the accuracy of the information extraction model.

Figure 4:
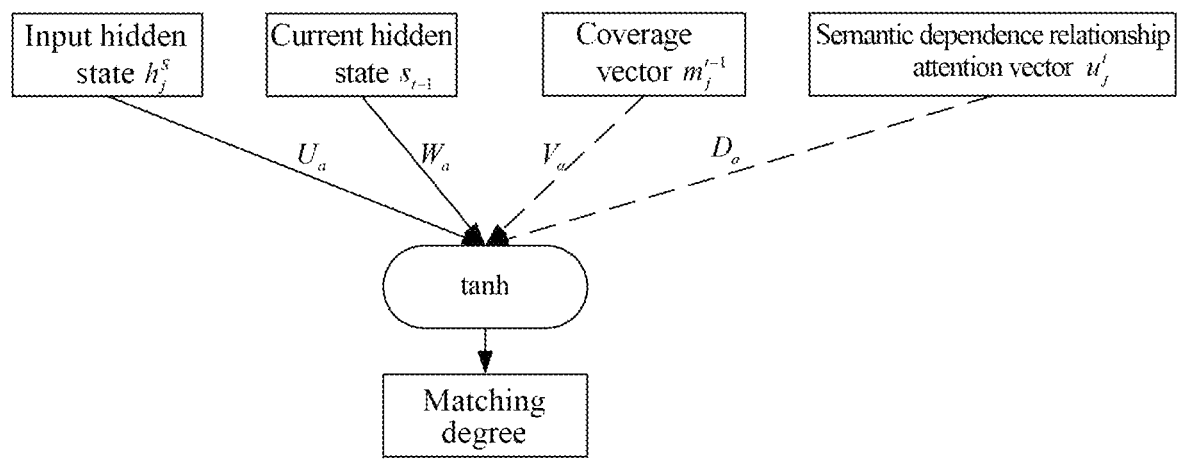
FIG. 4 is a schematic diagram of a principle of the method for computing the matching degree between the each input hidden state in the input hidden state sequence and the predictive state of the target position in the predictive state sequence to be generated according to the embodiments of the present application.

FIG. 4 shows a schematic diagram of a principle of the method for computing the matching degree between the each input hidden state in the input hidden state sequence and the predictive state of the target position in the predictive state sequence to be generated according to the embodiments of the present application. As shown in FIG. 4, the neural network of the information extraction model can obtain the matching degree by carrying out the nonlinear transformation of such as a tan h function on the input hidden state and the current hidden state; in another scenario, the matching degree can be obtained by carrying out the nonlinear transformation of such as the tan h function on the input hidden state, the current hidden state, and the coverage vector; the matching degree can also be obtained by carrying out the nonlinear transformation of such as the tan h function on the input hidden state, the current hidden state and the semantic dependence relationship attention vector; or the matching degree is obtained by carrying out the nonlinear transformation of such as the tan h function on the input hidden state, the current hidden state, the coverage vector and the semantic dependence relationship attention vector.

The attention weight of each input hidden state to the predictive state $h_t^O$ of the target position t can be computed based on the matching degree etj, and specifically, the attention weight αtj of the input hidden state $h_j^S$ of the jth position in the input hidden state sequence to the predictive state $h_t^O$ of the target position t is:

$$\alpha_{tj} = \frac{\exp(e_{tj})}{\sum_{k=1}^{N_S} \exp(e_{tk})} \quad (11)$$

The attention weight αtj may also be called as attention response intensity, and can be influence intensity of a previous predictive state or output state to decoding of the current input hidden state.

Then, weighted summation may be carried on each input hidden state according to the attention weight to obtain a context vector, and specifically, the context vector ct is:

$$c_t = \sum_{j=1}^{N_S} \alpha_{tj} h_j^S \quad (12)$$

Here, the context vector ct is a dynamic vector, and the context vectors of different target positions are different.

Then, the distribution of the probability of the predictive state $h_t^O$ of the target position is computed by using the context vector ct, the output hidden state $h_{t-1}^F$ of the previous position t−1 of the target position in the output hidden state sequence, and the state st of the hidden layer of the decoder when decoding the predictive state of the target position.

Specifically, the distribution of the probability of the predictive state $h_t^O$ of the target position can be computed according to Formula (13):

$$p(h_t^O | \{h_1^O, h_2^O, \ldots, h_{t-1}^O\}, c_t) = f(h_{t-1}^F, s_t, c_t) \quad (13)$$

wherein, f is a word generation model, and can be a nonlinear transformation function.

Finally, the predictive state of the target position is determined according to the probability distribution. A word that enables the probability p value to be maximal in Formula 13 can be searched in a preset vocabulary as the predictive state of the target position t. Here, the preset vocabulary may be predefined words for representing the all types of knowledge. When searching the word that enables the probability p value to be maximal, an optimal choice can be obtained by applying a greedy algorithm or beam search (a heuristic search algorithm).

It can be seen from Formulas (3)-(13) that the predictive state is related to each hidden state $h_j^S$ in the input hidden state sequence, the attention weight $\alpha tj$ determined according to the state of the hidden layer of the decoder after decoding the predictive state of the previous position of the target position, and the hidden state $h_{t-1}^F$ of the previous position of the target position in the output hidden state sequence; thus, the training method of the information extraction model in the present embodiment can be in conjunction with context information effectively and considers the influence of contexts at different positions on the decoding of the current position, and the accuracy of the model can be promoted.

In some optional implementations, the method for computing the distribution of the probability p can be optimized by using a restricted copy mechanism. The restricted copy mechanism is used for restricting following a rule of "using words in the source sentence to express knowledge as much as possible" in a decoding process, so as to avoid that the semantic difference between the knowledge information generated by the decoder and the source sentence is too large.

Specifically, the preset symbol set for assisting expression of knowledge, introduced into the knowledge expressed according to a preset rule, can be defined first, i.e., the symbols in the preset symbol set are used for combining with words in the sample sentence to completely characterize one of the following knowledge in the sample sentence: knowledge based on verbs or prepositions, knowledge based on noun attributes, knowledge of entity description, and knowledge of a relationship between an entity and a concept.

Optionally, the symbols in the preset symbol set may include but not limited to: a symbol for characterizing a separated predicate in a sentence; a symbol for characterizing reduced information in knowledge expressed by a reduced expression in the sentence; a symbol for characterizing implicit knowledge in the sentence; and a symbol for characterizing lost information in the sentence.

At this time, the probability of the predictive state of the target position may be a sum of a probability of copying a word from a corresponding sample sentence as an object in the output sequence and a probability of selecting a target symbol from a preset symbol set and using an object characterized by the target symbol as an object in the output sequence. In other words, $$p(h_t^O|\{h_1^O, h_2^O, \ldots, h_{t-1}^O\}, c_t) = p_X(h_t^O|\{h_1^O, h_2^O, \ldots, h_{t-1}^O\}, c_t) + p_K(h_t^O|\{h_1^O, h_2^O, \ldots, h_{t-1}^O\}, c_t) \quad (14)$$

wherein, pX is the probability of copying a word from a corresponding sample sentence as an object in the output sequence, pK is the probability of selecting a target symbol from the preset symbol set and using the object characterized by the target symbol as an object in the output sequence, and an optional computing mode is as follows:

$$p_X(h_t^O|\{h_1^O, h_2^O, \ldots, h_{t-1}^O\}, c_t) = \frac{1}{z}\exp(\sigma((h_j^S)^T W_c)s_t) \quad (15)$$

$$p_K(h_t^O|\{h_1^O, h_2^O, \ldots, h_{t-1}^O\}, c_t) = \frac{1}{z}\exp(v_i^T W_O s_t) \quad (15)$$

wherein, $W_c$ and $W_O$ are parameter matrices, and vi is a parameter vector.

Step 305, adjusting parameters of the neural network according to a difference between the predictive state sequence and the output hidden state sequence.

After the predictive state of each target position is generated and the predictive state sequence is then obtained, the predictive state sequence and the output hidden state sequence can be compared, and the parameters in the neural network of the information extraction model are adjusted according to the difference between the predictive state sequence and the output hidden state sequence.

Specifically, the difference between the predictive state sequence and the output hidden state sequence can be expressed by a loss function, then the gradient, related to the parameters in the neural network of the information extraction model, of the loss function is computed, and the parameters are updated by using a gradient descent method.

Further, as shown in FIG. 3 (the process shown by a dotted arrow), the input hidden state sequence can be input into the neural network with updated parameters again to obtain new predictive state sequence, and then the step of comparing the predictive state sequence and the output state sequence and updating the parameters is repeated until the loss function meets a preset convergence condition.

Based on the process shown in FIG. 3, the method for obtaining an information extraction model generating the output sequence from the input sequence by carrying out training with a deep learning method can accurately extract context information, and the lengths of the input hidden state sequence and the output hidden state sequence are variable and can flexibly adapt to different sentences. Thus, the information extraction model generated by the method shown in FIG. 3 can accurately extract all types of knowledge in the to-be-processed sentence. In an experimental result, the information extraction model generated by the process shown in FIG. 3 is superior to an existing rule-based method in terms of accuracy, recall rate and F value.

Figure 5:
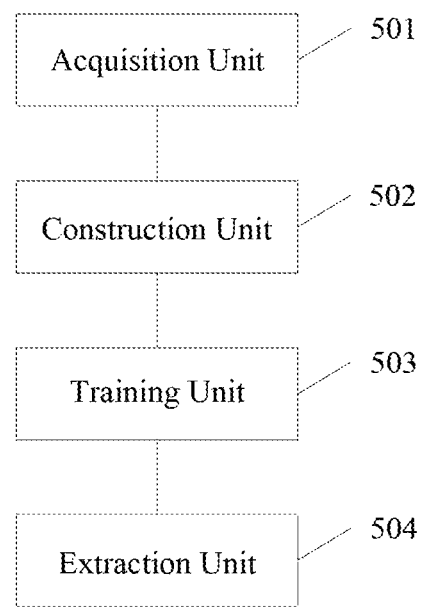
FIG. 5 is a structure diagram of an embodiment of the apparatus for extracting information according to the present application.

Further referring to FIG. 5, as the implementation of the method shown in FIG. 2, the present application provides an embodiment of the apparatus for extracting information, the embodiment of the apparatus corresponds to the embodiment of the method shown in FIG. 2, and the apparatus specifically can be applied to various types of electronic devices.

As shown in FIG. 5, the apparatus 500 for extracting information in the present embodiment may include: an acquisition unit 501, a construction unit 502, a training unit 503 and an extraction unit 504. Wherein, the acquisition unit 501 can be used for acquiring an annotated corpus including a plurality of sample sentences and annotated information sets corresponding to the sample sentences; the construction unit 502 can be used for constructing an input sequence and a corresponding output sequence based on the sample sentences and the annotated information sets corresponding to the sample sentences in the annotated corpus respectively; the training unit 503 can be used for obtaining an information extraction model generating the output sequence from the input sequence by carrying out training with a deep learning method; and the extraction unit 504 can be used for inputting a to-be-processed sentence into the generated information extraction model to extract a knowledge information set included in the to-be-processed sentence, wherein the annotated information set includes information, standardized according to a preset rule, of at least one piece of the following knowledge to be extracted from corresponding sample sentences: knowledge based on verbs or prepositions, knowledge based on noun attributes, knowledge of entity description, and knowledge of a relationship between an entity and a concept.

In the present embodiment, the annotated corpus may be pre-constructed and stored locally, so that the acquisition unit 501 can obtain the corpus from a local memory; or the annotated corpus may be stored in other electronic devices (e.g., a server), so that the acquisition unit 501 can obtain the corpus through communication connection with an electronic device for storing the annotated corpus. Here, the annotated corpus may include manually annotated corpus data which may be sentences in a text form and annotation results of knowledge information included in these sentences. Moreover, the knowledge information may be the information obtained after standardizing the knowledge included in the sentences according to a preset rule, and the preset rule can be used as a rule for annotating the knowledge in the sample sentence by an annotator.

The construction unit 502 can be used for performing word segmentation on the sample sentence; the words obtained based on word segmentation are constructed into an input sequence; and the annotated information set corresponding to the sample sentence can be constructed into an output sequence.

A model based on deep learning can be constructed by the training unit 503, and the model is then trained based on the input sequence and the output sequence corresponding to the annotated corpus. For example, a multilayer neural network may be constructed; the input sequence is used as input data of the multilayer neural network, and the multilayer neural network can perform prediction according to the input data to obtain a prediction result; and the output sequence is used as an annotation result, the difference between the prediction result and the annotation result is computed, parameters of the multilayer neural network are then adjusted to ensure that the difference is reduced to a certain range, so as to obtain a trained information extraction model.

The extraction unit 504 can perform information extraction on a to-be-processed sentence by using the information extraction model obtained by the training unit 503, and specifically can input the to-be-processed sentence into the information extraction model to obtain a to-be-processed knowledge information set.

In some embodiments, the training unit 503 is further used for obtaining an information extraction model generating the output sequence from the input sequence by carrying out training in the following manner: carrying out vectorization processing on objects in the input sequence and annotated information in the output sequence; constructing a neural network of the information extraction model, the neural network of the information extraction model comprising an encoder and a decoder; mapping the input sequence after the vectorization processing into an input hidden state sequence with the encoder, and mapping the output sequence into an output hidden state sequence with the decoder; decoding the input hidden state sequence with the decoder to obtain a predictive state sequence; and adjusting parameters of the neural network according to a difference between the predictive state sequence and the output hidden state sequence.

In a further embodiment, the training unit 503 is further used for obtaining the predictive state sequence in the following manner: for a target position in the predictive state sequence to be generated, obtaining a state, after a predictive state of a previous position of the target position is obtained by decoding, of a hidden layer of the decoder as a current hidden state of the decoder; computing a matching degree between each input hidden state in the input hidden state sequence and a predictive state of the target position in the predictive state sequence to be generated based on the current hidden state; computing an attention weight of the input hidden state to the predictive state of the target position based on the matching degree; carrying out weighted summation on the input hidden state according to the attention weight to obtain a context vector; computing a distribution of a probability of the predictive state of the target position based on the context vector, the output hidden state of the previous position of the target position in the output hidden state sequence, and the state of the hidden layer of the decoder when decoding the predictive state of the target position; and determining the predictive state of the target position according to the probability distribution.

In a further embodiment, the training unit 503 can be further used for computing the matching degree between the each input hidden state in the input hidden state sequence and the predictive state of the target position in the predictive state sequence to be generated in the following manner: carrying out a first nonlinear transformation on the current hidden state and the input hidden state to obtain the matching degree between the input hidden state and the predictive state of the target position.

In a further embodiment, the training unit 503 can be further used for computing the matching degree between the each input hidden state in the input hidden state sequence and the predictive state of the target position in the predictive state sequence to be generated in the following manner: computing a coverage vector corresponding to the target position based on the current hidden state, wherein the coverage vector is used for recording extracted information in the sample sentence; and carrying out a second nonlinear transformation on the current hidden state, the input hidden state and the coverage vector corresponding to the previous position of the target position to obtain the matching degree between the input hidden state and the predictive state of the target position.

In a further embodiment, the training unit 503 can further be used for executing the following operations before computing the matching degree between the each input hidden state in the input hidden state sequence and the predictive state of the target position in the predictive state sequence based on the current predictive state: extracting a semantic dependence relationship tree in the sample sentence by using a natural language processing device; adding a counter edge for each edge in the semantic dependence relationship tree to construct a path finding map; finding a semantic path between any two objects in the input sequence in the path finding map, and encoding the semantic path into a semantic vector; and transforming the semantic vector to obtain a semantic dependence relationship attention vector. Moreover, the training unit 503 can be used for computing the matching degree between the each input hidden state in the input hidden state sequence and the predictive state of the target position in the predictive state sequence to be generated in the following manner: carrying out a third nonlinear transformation based on the current hidden state, the input hidden state and the semantic dependence relationship attention vector to obtain the matching degree between the input hidden state and the predictive state of the target position.

In some embodiments, the probability of the predictive state of the target position may be a sum of a probability of copying a word from a corresponding sample sentence as an object in the output sequence and the probability of selecting a target symbol from a preset symbol set and using an object characterized by the target symbol as an object in the output sequence; and the symbols in the preset symbol set are used for combining with the words in the sample sentence, so as to completely characterize one of the following knowledge in the sample sentence: knowledge based on verbs or prepositions, knowledge based on noun attributes, knowledge of entity description, and knowledge of a relationship between an entity and a concept.

In a further embodiment, the symbols in the preset symbol set may include: a symbol for characterizing a separated predicate in a sentence; a symbol for characterizing reduced information in knowledge expressed by a reduced expression in the sentence; a symbol for characterizing implicit knowledge in the sentence; and a symbol for characterizing lost information in the sentence.

According to the apparatus 500 for extracting information, provided by the embodiments of the present application, the acquisition unit is used for acquiring an annotated corpus including a plurality of sample sentences and annotated information sets corresponding to the sample sentences; the construction unit is used for constructing an input sequence and a corresponding output sequence based on the sample sentences and the annotated information sets corresponding to the sample sentences in the annotated corpus respectively; the training unit is used for obtaining an information extraction model generating the output sequence from the input sequence by carrying out training with a deep learning method; and the extraction unit is used for inputting a to-be-processed sentence into the generated information extraction model to extract a knowledge information set included in the to-be-processed sentence, wherein the annotated information set includes information, standardized according to a preset rule, of at least one piece of the following knowledge to be extracted from corresponding sample sentences: knowledge based on verbs or prepositions, knowledge based on noun attributes, knowledge of entity description, and knowledge of a relationship between an entity and a concept; therefore, the extraction of a variety of different types of knowledge information is realized by using one information extraction model, the information extraction efficiency is promoted, the model obtained by training based on the deep learning method can adapt to diversity and flexibility of expression of a natural language, the deviation caused by limitation of rules is avoided, and the accuracy and recall rate of information extraction can be improved.

It should be understood that the units recorded in the apparatus 500 can be corresponding to the steps in the method for extracting information, as described with reference to FIG. 2 and FIG. 3. Therefore, the operations and characteristics described for the method for extracting information are also suitable for the apparatus 500 and the units included therein, and not more details are provided here.

Hereinafter, referring to FIG. 6, it shows a structure diagram of a computer system 600 of a terminal device or server suitable for implementing the embodiments of the present application. The terminal device or server shown in FIG. 6 is just an example, which does not impose any restrictions on the functionality and scope of application of the embodiments of the present application.

Figure 6:
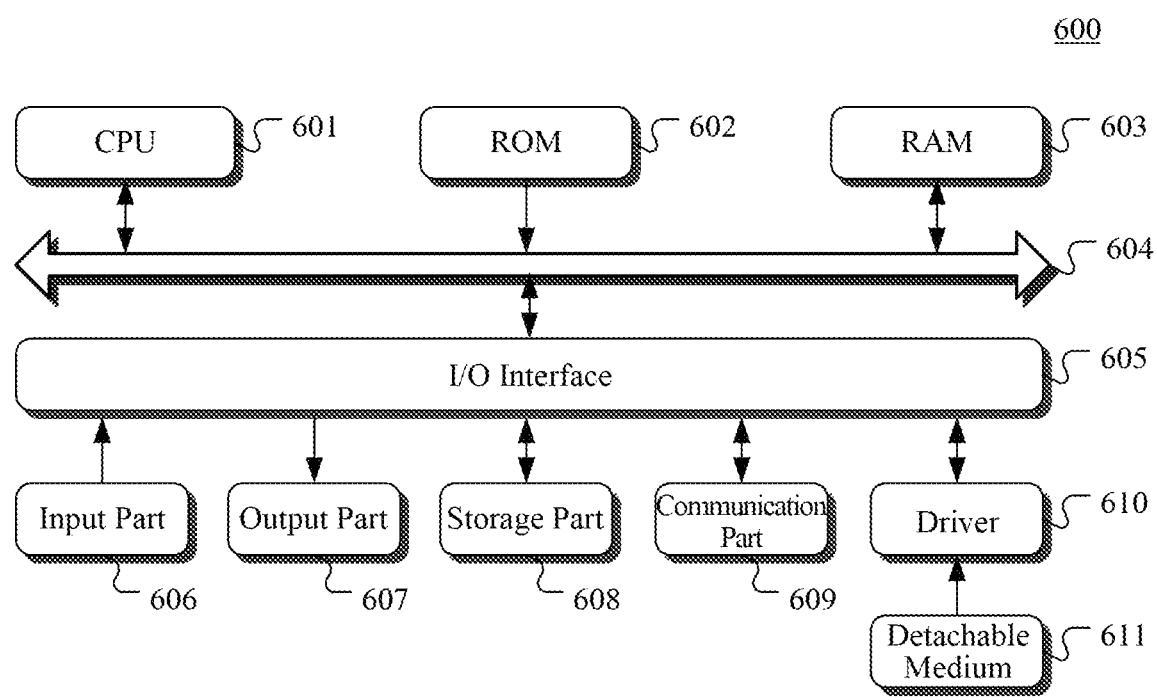
FIG. 6 is a structure diagram of a computer system of a server or a terminal device for implementing the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data that may be useful for operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present application. It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments described herein. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquisition unit, a construction unit, and a training unit, where the names of these units or modules are not considered as a limitation to the units or modules. For example, the acquiring unit may also be described as "a unit for acquiring an annotated corpus."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquiring an annotated corpus, the annotated corpus comprising a plurality of sample sentences and annotated information sets corresponding to each of the sample sentences; constructing an input sequence and a corresponding output sequence based on the sample sentences and the annotated information sets corresponding to the sample sentences in the annotated corpus respectively; generating an information extraction model of the output sequence from the input sequence by carrying out training with a deep learning method; and inputting a to-be-processed sentence into the generated information extraction model to extract a knowledge information set included in the to-be-processed sentence, wherein the annotated information set comprises information, standardized according to a preset rule, of at least one piece of following knowledge to be extracted from corresponding sample sentences: knowledge based on verbs or prepositions, knowledge based on noun attributes, knowledge of entity description, and knowledge of a relationship between an entity and a concept.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concepts discussed herein, such as, technical solutions formed by replacing the features as disclosed in the present application with (but not limited to), technical features with similar functions.

What is claimed is:

1. A method for extracting information, the method comprising:

acquiring an annotated corpus, the annotated corpus comprising a plurality of sample sentences and annotated information sets corresponding to the sample sentences;

constructing an input sequence and a corresponding output sequence based on the sample sentences and the annotated information sets corresponding to the sample sentences in the annotated corpus respectively;

obtaining an information extraction model generating the output sequence from the input sequence by carrying out training with a deep learning method; and inputting a to-be-processed sentence into the generated information extraction model to extract a knowledge information set included in the to-be-processed sentence, wherein the annotated information set comprises information, standardized according to a preset rule, of at least one piece of following knowledge to be extracted from corresponding sample sentences:

knowledge based on verbs or prepositions, knowledge based on noun attributes, knowledge of entity description, and knowledge of a relationship between an entity and a concept, the preset rule being a pre-defined symbol-assisted expression of various types of knowledge in the sample sentences, wherein obtaining an information extraction model generating the output sequence from the input sequence by carrying out training with a deep learning method comprises:

carrying out vectorization processing on objects in the input sequence and annotated information in the output sequence;

constructing a neural network of the information extraction model, the neural network of the information extraction model comprising an encoder and a decoder;

mapping the input sequence after the vectorization processing into an input hidden state sequence with the encoder, and mapping the output sequence into an output hidden state sequence with the decoder;

decoding the input hidden state sequence with the decoder to obtain a predictive state sequence; and adjusting parameters of the neural network according to a difference between the predictive state sequence and the output hidden state sequence; and wherein input hidden state sequence with the decoder to obtain a predictive state sequence comprises:

for a target position in the predictive state sequence to be generated, obtaining a state, after a predictive state of a previous position of the target position is obtained by decoding, of a hidden layer of the decoder as a current hidden state of the decoder;

extracting a semantic dependence relationship tree in the sample sentence using a natural language processing method;

adding a counter edge for each edge in the semantic dependence relationship tree to construct a path finding map;

finding a semantic path between any two objects in the input sequence in the path finding map, and encoding the semantic path into a semantic vector;

transforming the semantic vector to obtain a semantic dependence relationship attention vector;

by carrying out a third nonlinear transformation based on the current hidden state, the input hidden state and the semantic dependence relationship attention vector, computing a matching degree between each input hidden state in the input hidden state sequence and a predictive state of the target position in the predictive state sequence to be generated;

computing an attention weight of the each input hidden state to the predictive state of the target position based on the matching degree;

carrying out weighted summation on the each input hidden state according to the attention weight to obtain a context vector;

computing a distribution of a probability of the predictive state of the target position based on the context vector, the output hidden state of the previous position of the target position in the output hidden state sequence, and a state of the hidden layer of the decoder when decoding the predictive state of the target position; and determining the predictive state of the target position according to the probability distribution.

2. The method according to claim 1, wherein the computing a matching degree between each input hidden state in the input hidden state sequence and a predictive state of the target position in the predictive state sequence to be generated based on the current hidden state comprises:

carrying out a first nonlinear transformation on the current hidden state and the input hidden state to obtain the matching degree between the input hidden state and the predictive state of the target position.

3. The method according to claim 1, wherein the computing a matching degree between each input hidden state in the input hidden state sequence and a predictive state of the target position in the predictive state sequence to be generated based on the current hidden state comprises:

computing a coverage vector corresponding to the target position based on the current hidden state, wherein the coverage vector is used for recording extracted information in the sample sentence; and carrying out a second nonlinear transformation on the current hidden state, the input hidden state and the coverage vector corresponding to the previous position of the target position to obtain the matching degree between the input hidden state and the predictive state of the target position.

4. The method according to claim 1, wherein the probability of the predictive state of the target position is a sum of a probability of copying a word from a corresponding sample sentence as an object in the output sequence and a probability of selecting a target symbol from a preset symbol set and using an object characterized by the target symbol as an object in the output sequence; and symbols in the preset symbol set are used for combining with the words in the sample sentence, so as to completely characterize one of the following knowledge in the sample sentence: knowledge based on verbs or prepositions, knowledge based on noun attributes, knowledge of entity description, and knowledge of a relationship between an entity and a concept.

5. The method according to claim 4, wherein the symbols in the preset symbol set comprise:

a symbol for characterizing a separated predicate in a sentence;

a symbol for characterizing reduced information in knowledge expressed by a reduced expression in the sentence;

a symbol for characterizing implicit knowledge in the sentence; and a symbol for characterizing lost information in the sentence.

6. An apparatus for extracting information, the apparatus comprising:

at least one processor; and a memory storing instructions, which when executed by the at least one processor, cause the at least one processor to perform operations, the operations comprising:

acquiring an annotated corpus, the annotated corpus comprising a plurality of sample sentences and annotated information sets corresponding to the sample sentences;

constructing an input sequence and a corresponding output sequence based on the sample sentences and the annotated information sets corresponding to the sample sentences in the annotated corpus respectively;

generating an information extraction model of the output sequence from the input sequence by carrying out training with a deep learning method; and inputting a to-be-processed sentence into the generated information extraction model to extract a knowledge information set included in the to-be-processed sentence;

wherein the annotated information set comprises information, standardized according to a preset rule, of at least one piece of the following knowledge to be extracted from corresponding sample sentences:

knowledge based on verbs or prepositions, knowledge based on noun attributes, knowledge of entity description, and knowledge of a relationship between an entity and a concept, the preset rule being a pre-defined symbol-assisted expression of various types of knowledge in the sample sentences, wherein obtaining an information extraction model generating the output sequence from the input sequence by carrying out training with a deep learning method comprises:

carrying out vectorization processing on objects in the input sequence and annotated information in the output sequence;

constructing a neural network of the information extraction model, the neural network of the information extraction model comprising an encoder and a decoder;

mapping the input sequence after the vectorization processing into an input hidden state sequence with the encoder, and mapping the output sequence into an output hidden state sequence with the decoder;

decoding the input hidden state sequence with the decoder to obtain a predictive state sequence; and adjusting parameters of the neural network according to a difference between the predictive state sequence and the output hidden state sequence; and wherein input hidden state sequence with the decoder to obtain a predictive state sequence comprises:

for a target position in the predictive state sequence to be generated, obtaining a state, after a predictive state of a previous position of the target position is obtained by decoding, of a hidden layer of the decoder as a current hidden state of the decoder;

extracting a semantic dependence relationship tree in the sample sentence using a natural language processing method;

adding a counter edge for each edge in the semantic dependence relationship tree to construct a path finding map;

finding a semantic path between any two objects in the input sequence in the path finding map, and encoding the semantic path into a semantic vector;

transforming the semantic vector to obtain a semantic dependence relationship attention vector;

by carrying out a third nonlinear transformation based on the current hidden state, the input hidden state and the semantic dependence relationship attention vector, computing a matching degree between each input hidden state in the input hidden state sequence and a predictive state of the target position in the predictive state sequence to be generated;

computing an attention weight of the each input hidden state to the predictive state of the target position based on the matching degree;

carrying out weighted summation on the each input hidden state according to the attention weight to obtain a context vector;

computing a distribution of a probability of the predictive state of the target position based on the context vector, the output hidden state of the previous position of the target position in the output hidden state sequence, and a state of the hidden layer of the decoder when decoding the predictive state of the target position; and determining the predictive state of the target position according to the probability distribution.

7. The apparatus according to claim 6, wherein the computing a matching degree between each input hidden state in the input hidden state sequence and a predictive state of the target position in the predictive state sequence to be generated based on the current hidden state comprises:

carrying out a first nonlinear transformation on the current hidden state and the input hidden state to obtain the matching degree between the input hidden state and the predictive state of the target position.

8. The apparatus according to claim 6, wherein the computing a matching degree between each input hidden state in the input hidden state sequence and a predictive state of the target position in the predictive state sequence to be generated based on the current hidden state comprises:

computing a coverage vector corresponding to the target position based on the current hidden state, wherein the coverage vector is used for recording extracted information in the sample sentence; and carrying out a second nonlinear transformation on the current hidden state, the input hidden state and the coverage vector corresponding to the previous position of the target position to obtain the matching degree between the input hidden state and the predictive state of the target position.

9. The apparatus according to claim 6, wherein the probability of the predictive state of the target position is a sum of a probability of copying a word from a corresponding sample sentence as an object in the output sequence and a probability of selecting a target symbol from a preset symbol set and using an object characterized by the target symbol as an object in the output sequence; and symbols in the preset symbol set are used for combining with the words in the sample sentence, so as to completely characterize one of the following knowledge in the sample sentence: knowledge based on verbs or prepositions, knowledge based on noun attributes, knowledge of entity description, and knowledge of a relationship between an entity and a concept.

10. The apparatus according to claim 9, wherein the symbols in the preset symbol set comprise:

a symbol for characterizing a separated predicate in a sentence;

a symbol for characterizing reduced information in knowledge expressed by a reduced expression in the sentence;

a symbol for characterizing implicit knowledge in the sentence; and a symbol for characterizing lost information in the sentence.

11. A computer readable storage medium, on which computer programs are stored, wherein when the programs are executed by one or more processors, cause the one or more processors to perform operations, the operations comprising:

acquiring an annotated corpus, the annotated corpus comprising a plurality of sample sentences and annotated information sets corresponding to the sample sentences;

constructing an input sequence and a corresponding output sequence based on the sample sentences and the annotated information sets corresponding to the sample sentences in the annotated corpus respectively;

obtaining an information extraction model generating the output sequence from the input sequence by carrying out training with a deep learning method; and inputting a to-be-processed sentence into the generated information extraction model to extract a knowledge information set included in the to-be-processed sentence, wherein the annotated information set comprises information, standardized according to a preset rule, of at least one piece of following knowledge to be extracted from corresponding sample sentences:

knowledge based on verbs or prepositions, knowledge based on noun attributes, knowledge of entity description, and knowledge of a relationship between an entity and a concept, the preset rule being a pre-defined symbol-assisted expression of various types of knowledge in the sample sentences, wherein obtaining an information extraction model generating the output sequence from the input sequence by carrying out training with a deep learning method comprises:

carrying out vectorization processing on objects in the input sequence and annotated information in the output sequence;

constructing a neural network of the information extraction model, the neural network of the information extraction model comprising an encoder and a decoder;

mapping the input sequence after the vectorization processing into an input hidden state sequence with the encoder, and mapping the output sequence into an output hidden state sequence with the decoder;

decoding the input hidden state sequence with the decoder to obtain a predictive state sequence; and adjusting parameters of the neural network according to a difference between the predictive state sequence and the output hidden state sequence; and wherein input hidden state sequence with the decoder to obtain a predictive state sequence comprises:

for a target position in the predictive state sequence to be generated, obtaining a state, after a predictive state of a previous position of the target position is obtained by decoding, of a hidden layer of the decoder as a current hidden state of the decoder;

extracting a semantic dependence relationship tree in the sample sentence using a natural language processing method;

adding a counter edge for each edge in the semantic dependence relationship tree to construct a path finding map;

finding a semantic path between any two objects in the input sequence in the path finding map, and encoding the semantic path into a semantic vector;

transforming the semantic vector to obtain a semantic dependence relationship attention vector;

by carrying out a third nonlinear transformation based on the current hidden state, the input hidden state and the semantic dependence relationship attention vector, computing a matching degree between each input hidden state in the input hidden state sequence and a predictive state of the target position in the predictive state sequence to be generated;

computing an attention weight of the each input hidden state to the predictive state of the target position based on the matching degree;

carrying out weighted summation on the each input hidden state according to the attention weight to obtain a context vector;

computing a distribution of a probability of the predictive state of the target position based on the context vector, the output hidden state of the previous position of the target position in the output hidden state sequence, and a state of the hidden layer of the decoder when decoding the predictive state of the target position; and determining the predictive state of the target position according to the probability distribution.

\* \* \* \* \*